(12) United States Patent
Shah et al.

(10) Patent No.: US 9,152,817 B1
(45) Date of Patent: Oct. 6, 2015

(54) METHODS AND SYSTEMS FOR PERFORMING DATA PROTECTION OPERATIONS

(75) Inventors: Sunil Shah, Fremont, CA (US); Ynn-Pyng A. Tsaur, Oviedo, FL (US); Sudhir Subbarao, Karnataka (IN)

(73) Assignee: Symantec Corporation, Mountain View, CA (US)

( * ) Notice: Subject to any disclaimer, the term of this patent is extended or adjusted under 35 U.S.C. 154(b) by 726 days.

(21) Appl. No.: 11/932,216

(22) Filed: Oct. 31, 2007

(51) Int. Cl.
*G06F 17/30* (2006.01)
*G06F 21/62* (2013.01)

(52) U.S. Cl.
CPC ................................ *G06F 21/6227* (2013.01)

(58) Field of Classification Search
CPC combination set(s) only.
See application file for complete search history.

(56) References Cited

U.S. PATENT DOCUMENTS

| | | | |
|---|---|---|---|
| 5,918,229 A | 6/1999 | Davis et al. | |
| 7,120,650 B2 | 10/2006 | Loy et al. | |
| 7,203,700 B1 * | 4/2007 | Kumar et al. | 1/1 |
| 7,392,421 B1 | 6/2008 | Bloomstein et al. | |
| 7,444,335 B1 * | 10/2008 | Colrain et al. | 709/220 |
| 2004/0024833 A1 | 2/2004 | Siddabathuni | |
| 2004/0093358 A1 | 5/2004 | Ito et al. | |
| 2005/0283481 A1 | 12/2005 | Rosenbach et al. | |
| 2006/0064400 A1 | 3/2006 | Tsukerman et al. | |
| 2006/0282481 A1 | 12/2006 | Zhou et al. | |
| 2007/0038888 A1 | 2/2007 | Kariv | |
| 2007/0203944 A1 | 8/2007 | Batra et al. | |
| 2007/0220059 A1 | 9/2007 | Lu et al. | |
| 2008/0281938 A1 * | 11/2008 | Rai et al. | 709/209 |

OTHER PUBLICATIONS

Non-Final Office Action Received in Related U.S. Appl. No. 11/864,956; Oct. 28, 2009.
Non-Final Office Action Received in Related U.S. Appl. No. 11/864,956; Aug. 6, 2010.
Final Office Action Received in Related U.S. Appl. No. 11/864,956; May 11, 2010.
Sunhil Shah, et al; Methods and Systems for Application Cluster Virtual Nodes; U.S. Appl. No. 11/864,956, filed Sep. 29, 2007.
Symantec, "Veritas Cluster Server User's Guide", http://www.symantec.com/business/support/index?page=content &id=TECH52406, Version 5.0, (2006).
Oracle, "Configuring Oracle Reports Servers for High Availability", http://docs.oracle.com/html/A96684_01/ofs_rep.htm, (1996, 2002).

\* cited by examiner

*Primary Examiner* — Shyue Jiunn Hwa
(74) *Attorney, Agent, or Firm* — ALG INTELLECTUAL PROPERTY, LLC

(57) ABSTRACT

A method for performing a data protection operation. The method may include receiving a virtual node that identifies a plurality of physical nodes. The virtual node may be associated with a clustered database. The method may include receiving a request to perform a data protection operation on the clustered database. The method may also include using information from the virtual node to identify a first physical node in the plurality of physical nodes and attempting to perform the data protection operation on the clustered database through the first physical node. A computer-readable medium is also disclosed.

20 Claims, 11 Drawing Sheets

METHODS AND SYSTEMS FOR PERFORMING DATA PROTECTION OPERATIONS

BACKGROUND

In the age of digital information, both individuals and enterprises have come to rely on computing systems and the data they store in almost every aspect of life. Often, the data itself is much more valuable than the underlying hardware that stores the data. Thus, many enterprises and individuals take precautions to protect their data.

One way of protecting data is to backup data. A backup computing system may store a copy of the data as it existed at a previous instant in time. The backup copy of the data may be periodically updated. More frequent updates tend to increase the freshness of the data at the backup computing system.

At some point, the data at the primary computing system may become inaccessible or otherwise lost. For example, the data may become corrupted due to a system failure or viral infiltration. Software (such as the operating system, application, or drivers) needed to access the data may also be corrupted. Furthermore, hardware needed to access the data may become damaged. After a system failure, data may be restored by replacing any damaged hardware and then copying data from the backup computing system to the primary computing system.

Typically, software is backed up using a data protection application. Data protection applications may not be optimized to backup data controlled or stored by an application cluster. For example, a data protection application may inadvertently backup multiple copies of the same data when backing up data associated with the application cluster. A data protection application may also fail to take advantage of various features of an application cluster.

SUMMARY

According to certain embodiments, a method may comprise receiving a virtual node that identifies a plurality of physical nodes. The virtual node may be associated with a clustered database. The method may comprise receiving a request to perform a data protection operation on a clustered database. The method may also comprise using information from the virtual node to identify a first physical node in the plurality of physical nodes. The method may comprise attempting to perform the data protection operation on the database through the first physical node.

In at least one embodiment, the method may comprise connecting to the first physical node and determining whether a first instance of the clustered database is running on the first physical node. In some embodiments, the determining may comprise determining that the first instance of the clustered database is not running. According to certain embodiments, the method may further comprise updating the virtual node to exclude identification information of the first physical node after determining that the first instance of the clustered database is not running.

In various embodiments, the method may comprise using information from the virtual node to identify a second physical node in the plurality of physical nodes. The method may comprise determining that a second instance of the clustered database is running on the second physical node. The method may also comprise performing the data protection operation on the clustered database through the second physical node.

According to various embodiments, the determining may further comprise determining that the first instance of the clustered database is running. In some embodiments, the method may further comprise performing the data protection operation on the clustered database through the first node. In at least one embodiment, the method may further comprise determining that the first physical node is not accessible and updating the virtual node to exclude identification information of the first physical node. The method may further comprise attempting to perform the data protection operation on the clustered database through a second physical node in the plurality of physical nodes.

According to various embodiments, the method may comprise connecting to the first physical node and determining that a data protection module is not running on the first physical node. The method may further comprise updating the virtual node to exclude identification information of the first physical node. In some embodiments, the data protection operation may comprise at least one of: a backup operation, a restoration operation, and/or a recovery operation.

In certain embodiments, a method may comprise receiving a virtual node that identifies a plurality of physical nodes. The virtual node may be associated with a clustered database. The method may also comprise receiving a request to backup a clustered database. The method may further comprise using information from the virtual node to identify a first physical node in the plurality of physical nodes. The method may comprise attempting to backup the database through the first physical node and receiving a failure indication. The failure indication may indicate failure of the attempt to backup the database through the first physical node. The method may comprise using information from the virtual node to identify a second physical node in the plurality of physical nodes. The method may also comprise backing up the database through the second physical node.

According to at least one embodiment, the method may comprise updating the virtual node to exclude identification information of the first physical node after determining that the first instance of the clustered database is not running. In some embodiments, each node in the plurality of physical nodes, except the first physical node, may comprise an instance of the clustered database. In at least one embodiment, the method may further comprise connecting to the first physical node, determining that a backup module is not running on the first physical node, and updating the virtual node to exclude identification information of the first physical node. According to some embodiments, the method may comprise presenting a representation of each node in the plurality of physical nodes to a user and receiving, from the user, a selection of the first physical node.

In certain embodiments, a computer-readable medium may comprise a first computer-executable instruction operable to receive a virtual node that identifies a plurality of physical nodes. The virtual node may be associated with a clustered database. The computer-readable medium may also comprise a second computer-executable instruction operable to receive a request to backup a clustered database. The computer-readable medium may further comprise a third computer-executable instruction operable to use information from the virtual node to identify a first physical node in the plurality of physical nodes. The computer-readable medium may comprise a fourth computer-executable instruction operable to attempt to perform a data protection operation on the clustered database through the first physical node.

In some embodiments, the computer-readable medium may comprise a fifth computer-executable instruction operable to determine that the data protection operation cannot be performed through the first physical node. According to various embodiments, a computer-readable medium may comprise a sixth computer-executable instruction operable to use information from the virtual node to identify a second physical node in the plurality of physical nodes. The computer-readable medium may also comprise a seventh computer-executable instruction operable to determine that a second instance of the clustered database is running on the second physical node. The computer-readable medium may comprise an eighth computer-executable instruction operable to backup the clustered database through the second physical node.

According to various embodiments, the computer-readable medium may comprise a ninth computer-executable instruction operable to determine whether an instance of the clustered database is running on the first physical node. In some embodiments, the computer-readable medium may comprise a ninth computer-executable instruction operable to determine whether the first physical node is accessible. In some embodiments, the computer-readable medium may comprise a ninth computer-executable instruction operable to determine whether a data protection module is running on the first physical node.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
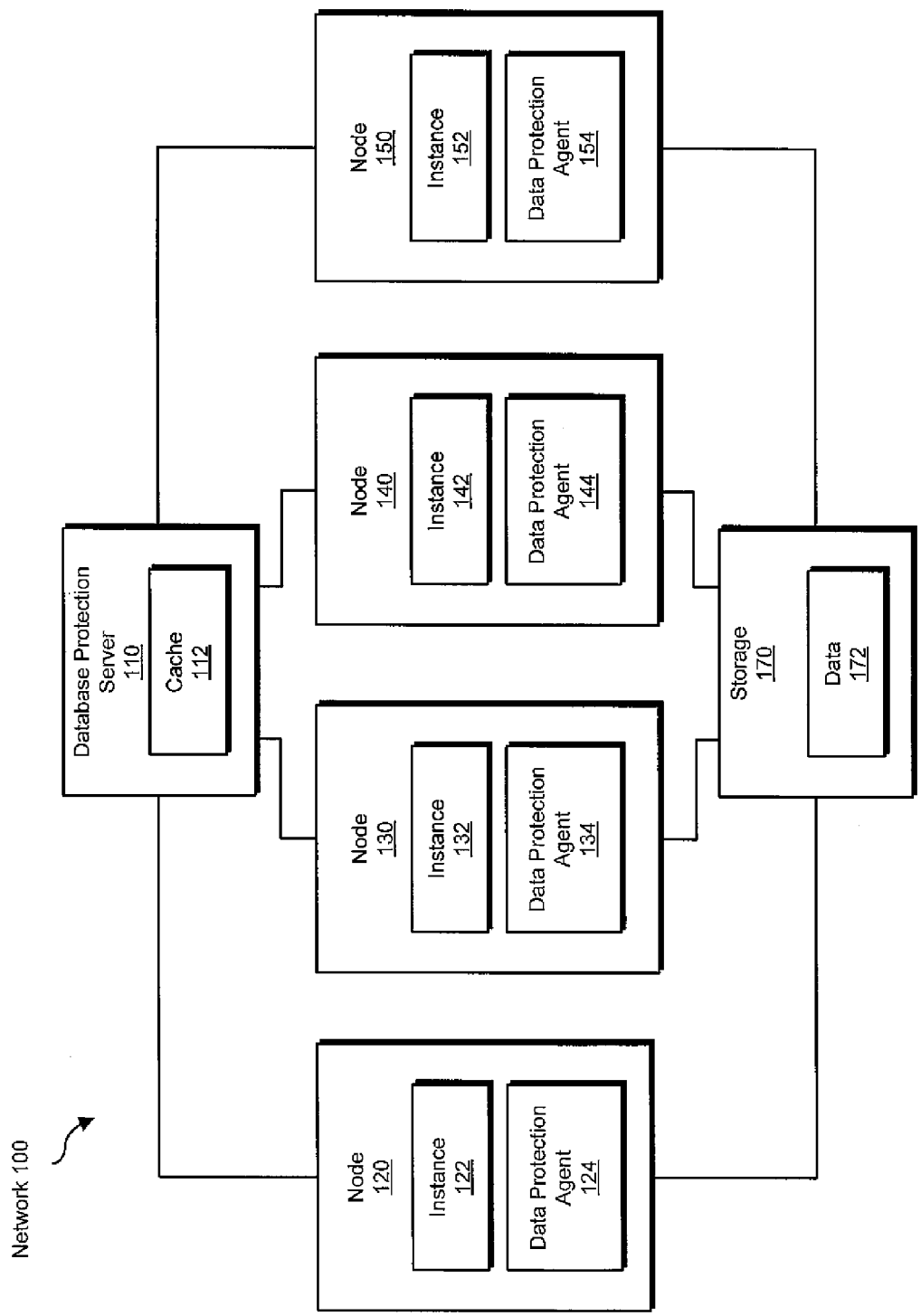
FIG. 1 is a block diagram of an exemplary network according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

The following is intended to provide a detailed description of various exemplary embodiments and should not be taken to be limiting in any way. Various exemplary methods and systems for creating and presenting virtual nodes are described and/or illustrated herein. Various exemplary methods and systems for performing data protection operations through a virtual node are also disclosed. Many of the embodiments presented herein discuss database and other data management systems; however, the principles of the instant disclosure apply to various other computer applications and systems. As discussed in greater detail below, embodiments of the instant disclosure may provide more efficient and reliable data management and protection.

Embodiments of the present disclosure may improve communication between a data protection module and an application cluster. A data protection module may be a module or application capable of backing up data, restoring data, repairing data, recovering data, and/or providing any other data protection function. An application cluster may be an application capable of being simultaneously accessed by multiple nodes. An example of an application cluster is a clustered database (e.g., ORACLE REAL APPLICATION CLUSTER). Protecting data associated with an application cluster may present several unique challenges.

An explanation of the nature of application clusters may provide insight into the challenges of protecting application cluster data. As previously noted, an application cluster may be a clustered database. A clustered database may allow database management software running on multiple computers to simultaneously access a single database. In other words, two or more computers, each with a database instance, may concurrently access a single database. As used herein, a computing device running an instance may be referred to as a node or a physical node. A node may be a computing device with an object, a module, or any other suitable access point for data associated with an application cluster.

A clustered database may have many advantages over a non-clustered database. For example, a clustered database may provide high availability for the database. Also, data architects may be able to use a clustered database to create database infrastructures without single points-of-failure by employing redundancy. Redundancy may reduce the chance that any set of simultaneous failures will cause a loss of connectivity to the database. Also, a clustered database may be more scalable that a single-instance database.

A clustered database may also have some disadvantages over other types of databases, particularly with respect to backing up the database. For example, a clustered database may be accessible through several nodes. A user may not realize that each of these nodes are connected to the same database and may select all the nodes for backup. As a result, data from the database may be backed up multiple times, which may waste time and resources. Furthermore, having multiple backup copies of the same database may create confusion for a network administrator during a restoration or recovery process.

In another example, a network administrator may select only a single node for backing up a database. If the selected node is inoperable, the backup operation may fail even if another node associated with the database is running and available. Another problem with backing up and restoring data in a clustered database is that cataloging of backup data is typically tied to the computer where the data lies. If a network administrator attempts to backup a clustered database from different nodes at different points in time and then presents them as one database under different nodes, users may become confused. Embodiments of the present disclosure may address one or more of these problems and may provide various other features and advantages.

FIG. 1 illustrates a network 100. Network 100 may include a database protection server 110. Database protection server 110 may be any suitable database protection application or module and may run on any suitable computing and/or storage device. In some embodiments, database protection server 110 may be a media server.

An application cluster may be any suitable application cluster, such as a clustered database. An application cluster may include several instances that run on different nodes. For example, an application cluster may include an instance 122, an instance 132, an instance 142, and an instance 152.

Database protection server 110 may be connected to a node 120, a node 130, a node 140, and a node 150. Nodes 120, 130, 140, and 150 may be connected to database protection server 110 and storage 170 through a network. Storage 170 may be any suitable storage and/or computing device. Storage 170 may store data 172. Data 172 may be a database or any other suitable data structure or compilation of data.

Node 120 may include a data protection agent 124 and an instance 122 of the application cluster. Data protection agent 124 may be a backup agent, a restoration agent, a recovery agent, or any other suitable data protection application or module. Node 130 may include a data protection agent 134 and an instance 132 of the application cluster. Node 140 may include a data protection agent 144 and an instance 142 of the application cluster. Node 150 may include a data protection agent 154 and an instance 152 of the application cluster. Nodes 120, 130, 140, and 150 may provide access to data 172 on storage 170 through instances 122, 132, 142, and 152. Data protection agents 124, 134, 144, and 154 may be associated with data protection server 110.

Figure 2:
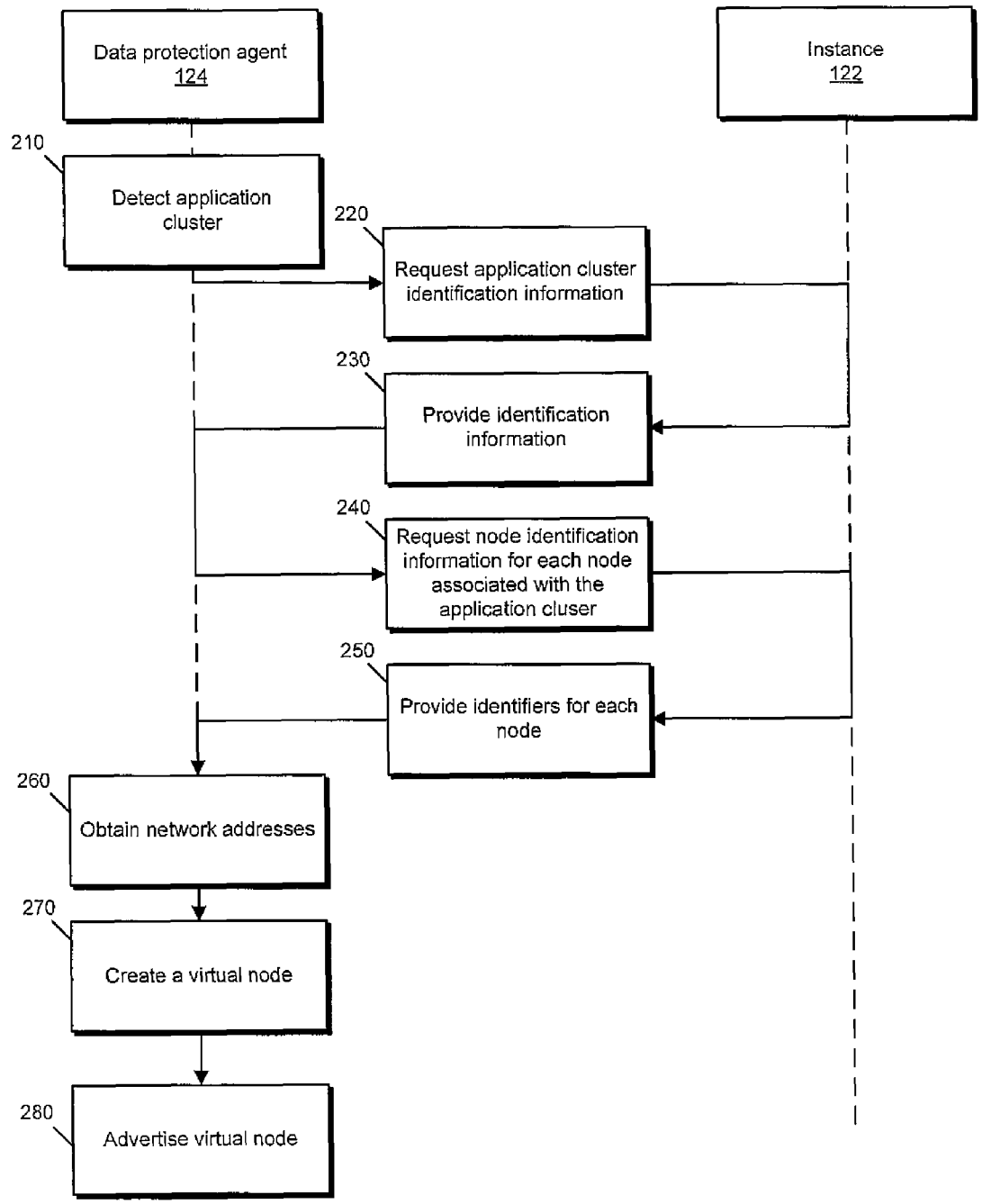
FIG. 2 is a flow diagram of exemplary communications between a data protection agent and an instance of a clustered application according to certain embodiments.

According to embodiments of the present disclosure, a virtual node may also provide access to the application cluster. A virtual node may optimize backup, restore, and other data protection functions performed on data associated with an application cluster. FIG. 2 illustrates an exemplary process for creating and caching a virtual node.

FIG. 2 illustrates an exemplary method that results in the creation and caching of a virtual node. FIG. 2 shows various communications between data protection agent 124 and instance 122. First, data protection agent 124 may detect that it is running on a node of an application cluster (step 210). In other words, data protection agent 124 may detect that instance 122 is part of an application cluster. In some embodiments, data protection agent 124 may detect that the application cluster is a clustered database rather than a single-instance database.

After detecting the application cluster, data protection agent 124 may request application cluster identification information from instance 122 (step 220). In response, instance 122 may provide identification information to data protection agent 124 (step 230). Identification information may be a name of the application cluster, an identification number of the application cluster, and/or any other information that identifies the data protection agent. After receiving the identification information, data protection agent 124 may request identification information of each node associated with the application cluster (step 240). A node may be referred to as being associated with an application cluster if the node is an access point for the application cluster. A node associated with an application cluster may also be referred to as a participating node. In some embodiments, steps 220 and 240 may be performed simultaneously. In other words, data protection agent 124 may request application cluster identification information and node identification information at the same time.

Instance 122 may provide node identification information for each participating node to data protection agent 124. In some embodiments (e.g., for an ORACLE REAL APPLICATION CLUSTER), the instance may already have identification information for each participating node.

Data protection agent 124 may obtain network addresses for each node associated with the application cluster (step 260). According to various embodiments, data protection agent 124 may obtain the network addresses by using the identification information for the node to find the network address. In other embodiments, data protection agent 124 may receive the network addresses of each of the nodes after requesting node identification information from instance 122. A network address may be an Internet Protocol (IP) address or any other suitable network address.

Figure 3:
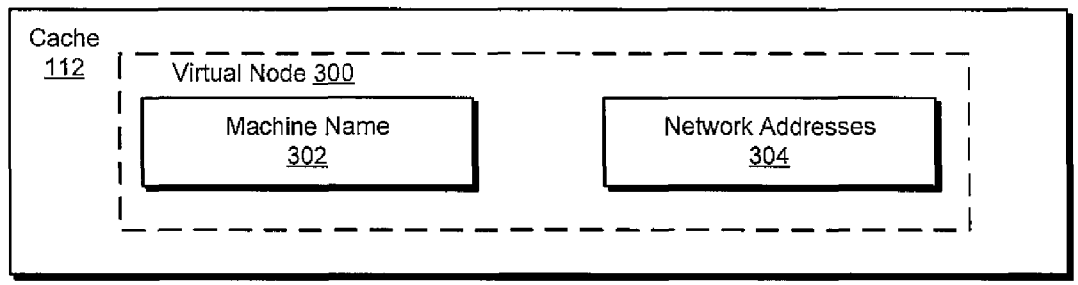
FIG. 3 is a block diagram of an exemplary virtual node in a cache according to certain embodiments.

After data protection agent 124 obtains network addresses for each node, data protection agent 124 may create a virtual node (step 270). A virtual node may be created by aggregating identification information for each node associated with an application cluster. For example, a virtual node for an application cluster may contain identification information for each of nodes 120, 130, 140, and 150. An example of a virtual node is illustrated in FIG. 3. After creating a virtual node, data protection agent 124 may advertise the virtual node to database protection server 110 (step 280). Database protection server 110 may then store the virtual node in cache 112. In some embodiments, a virtual node may be created by modifying, adding, or deleting steps shown in FIG. 2. According to various embodiments, data protection module 134, data protection module 144, and data protection module 154 may each create a virtual node by communicating with their respective database instances. Thus, each of nodes 130, 140, and 150 may also create a virtual node by the same process described in FIG. 2.

FIG. 3 illustrates an exemplary virtual node 300 stored in cache 112. As shown, virtual node 300 may comprise a machine name 302 and network addresses 304. A machine name may include a name of an application cluster and an identification number of the application cluster. A machine name may also include any other suitable identification information. Network addresses 304 may include network addresses for each of nodes 120, 130, 140, and 150.

During the process of creating a virtual node, each of nodes 130, 140, and 150 may receive the same information (i.e., identification information for the application cluster and for the nodes associated with application cluster) from the instances of the application cluster. Thus, each node would create virtual nodes with the same information without any intra-node communication. In some embodiments, each time a node advertises a virtual node, database protection server 110 will overwrite the preexisting data in cache 112. In such embodiments it may be important for each node to advertise identification information for itself and every other node associated with the application cluster so that cache 112 will always have identification information for each participating node. A virtual node (e.g., identification information for all nodes associated with the application cluster) may allow the application cluster to be tied only to the virtual node rather than being tied to a specific physical node. This may ensure that the application cluster does not appear under each node for backup, recovery, or any other data protection operation.

Since the application cluster may not appear under physical nodes 120, 130, 140, or 150, when a backup of the application cluster is scheduled, each node will not perform the backup because only a single node (i.e., the virtual node) is presented to data protection server 110. Another advantage of using virtual nodes is that a data protection server may use the virtual node to identify each physical node associated with a virtual node and may present the physical nodes to a user for selection. The user may select which node to use when performing a data protection operation. Data protection operations may include backing up data, restoring data, recovering data, or any other suitable operation.

Figure 4:
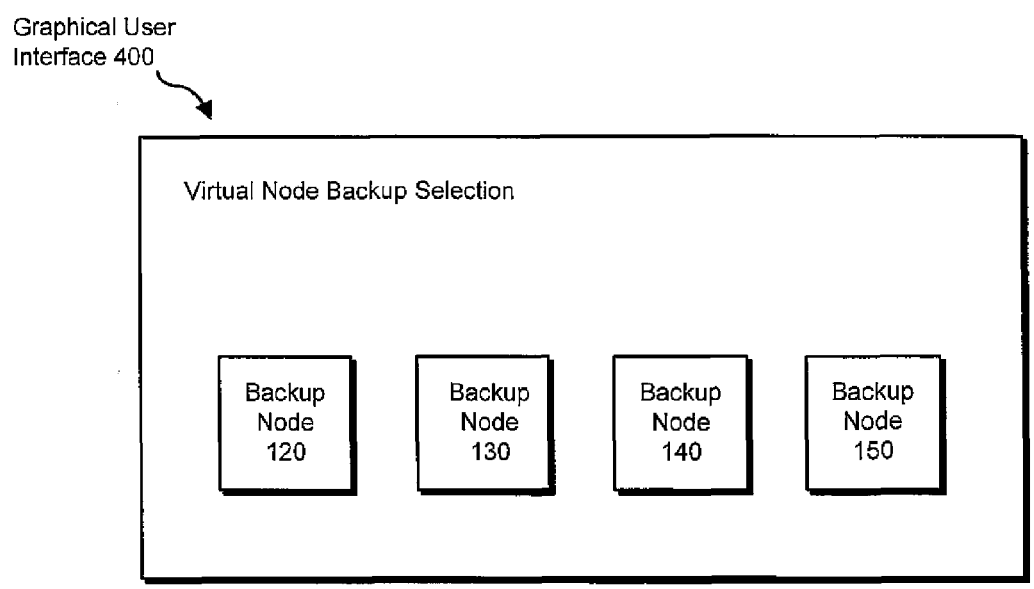
FIG. 4 is a block diagram of an exemplary graphical user interface according to certain embodiments.

FIG. 4 illustrates a graphical user interface 400 that may be presented to a user for node selection. Graphical user interface 400 may allow a user to select from the nodes associated with the application cluster (e.g., nodes 120, 130, 140, and 150). In such embodiments, a virtual node may allow a user to see which physical nodes are associated with an application cluster. A virtual node may reduce user confusion by enabling a data protection server to present an application cluster as a single virtual node with underlying physical nodes.

Figure 7:
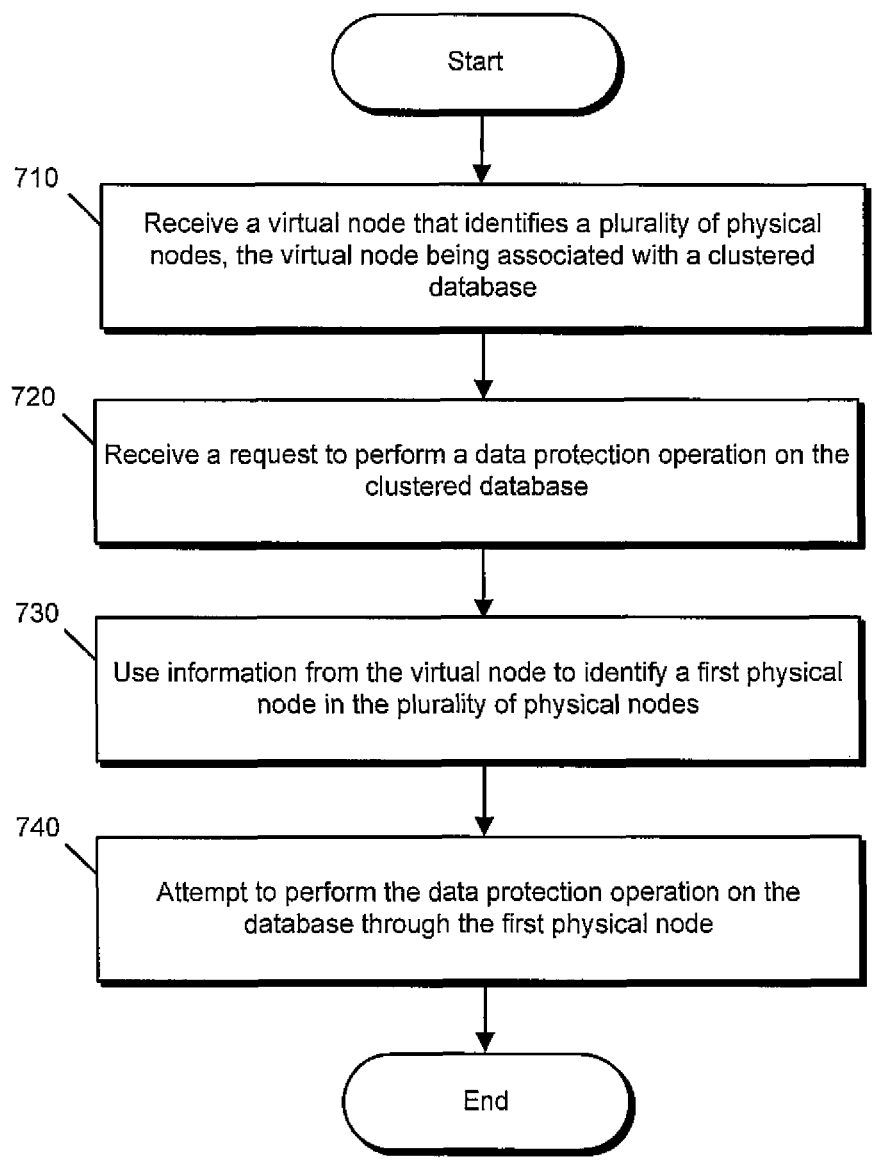
FIG. 7 is a flow diagram of an exemplary method of performing a data protection operation on a database according to certain embodiments.
Figure 8A:
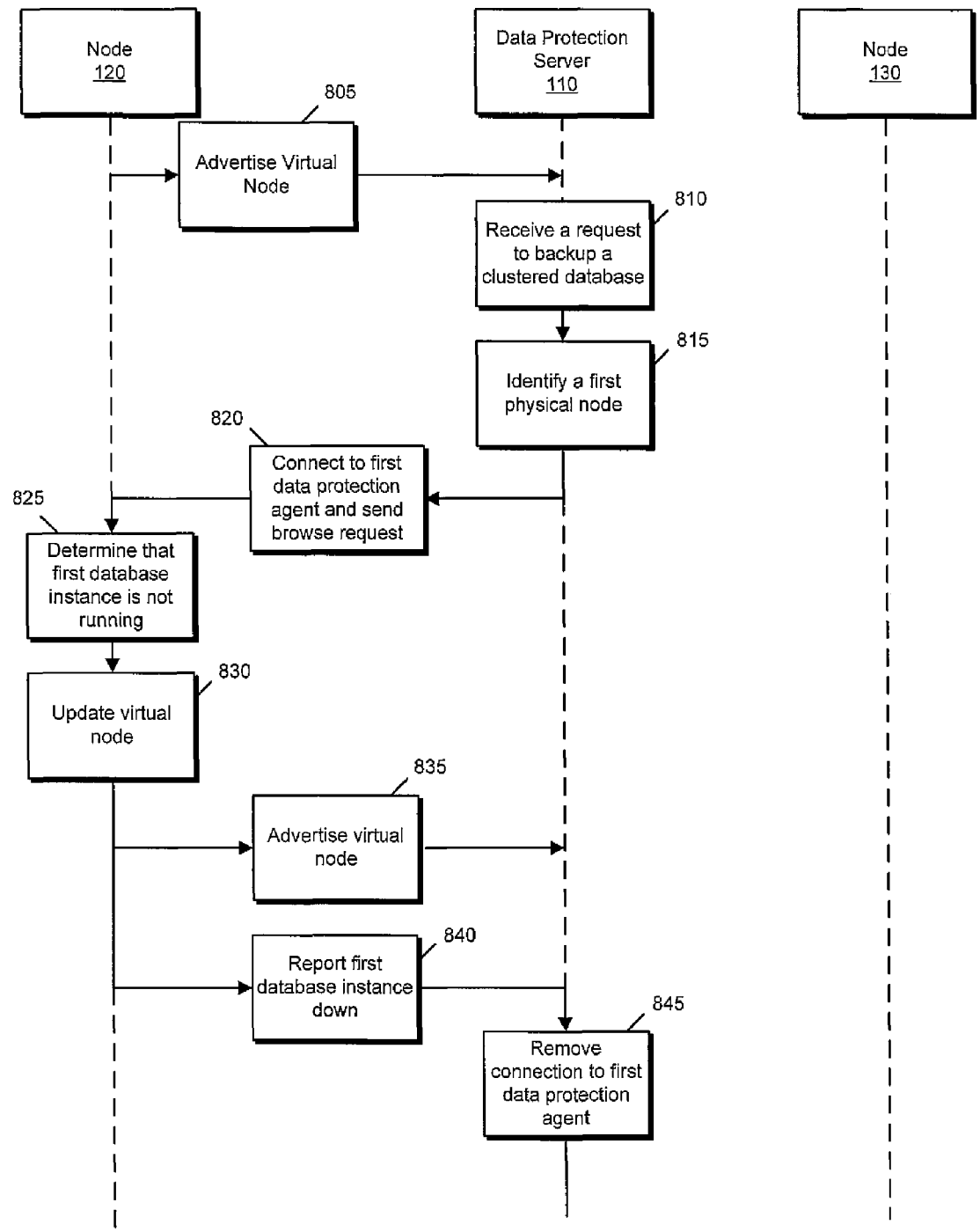
FIGS. 8A and 8B are flow diagrams of an exemplary method of backing up a database through a virtual node according to certain embodiments.
Figure 8B:
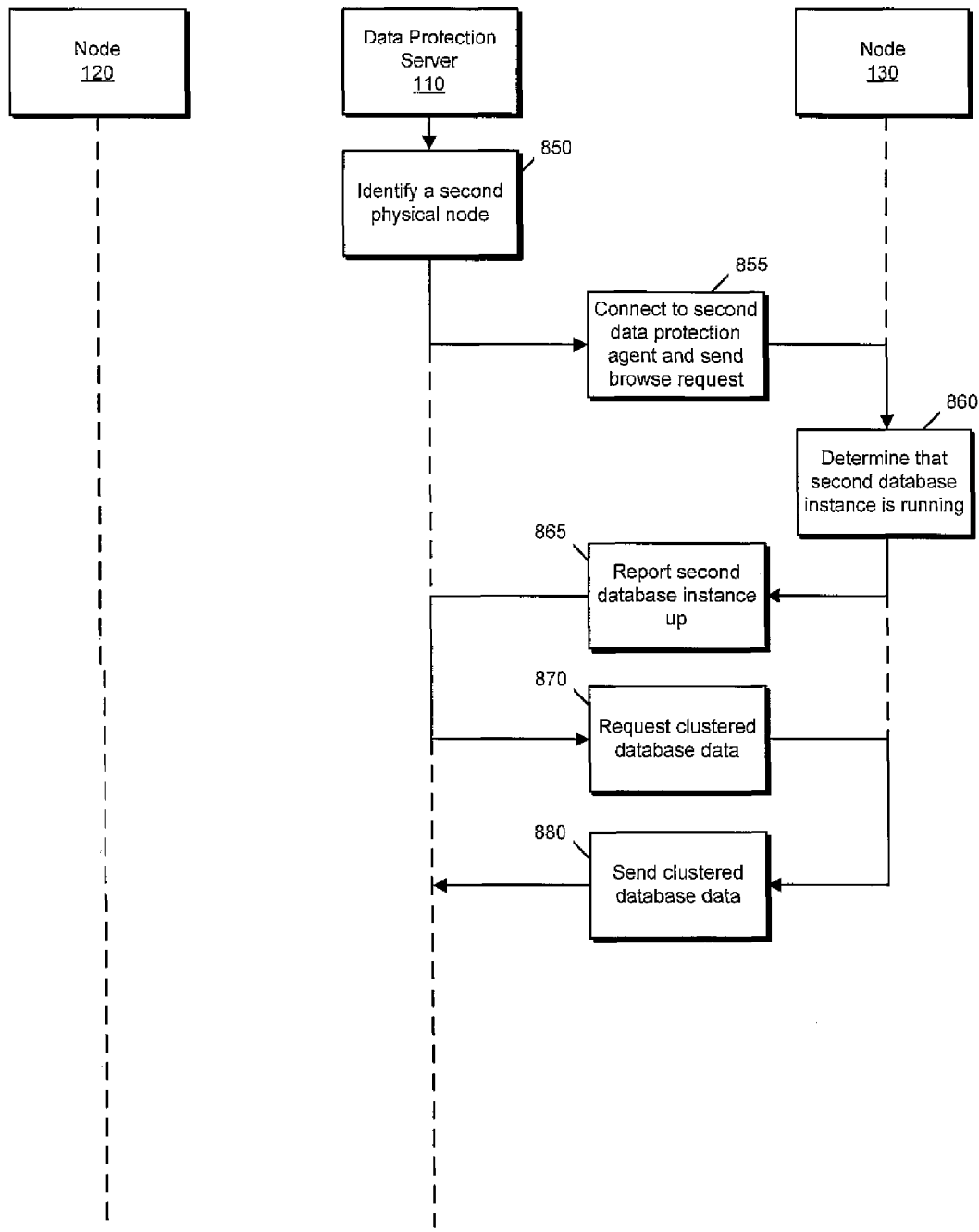
Figure 9:
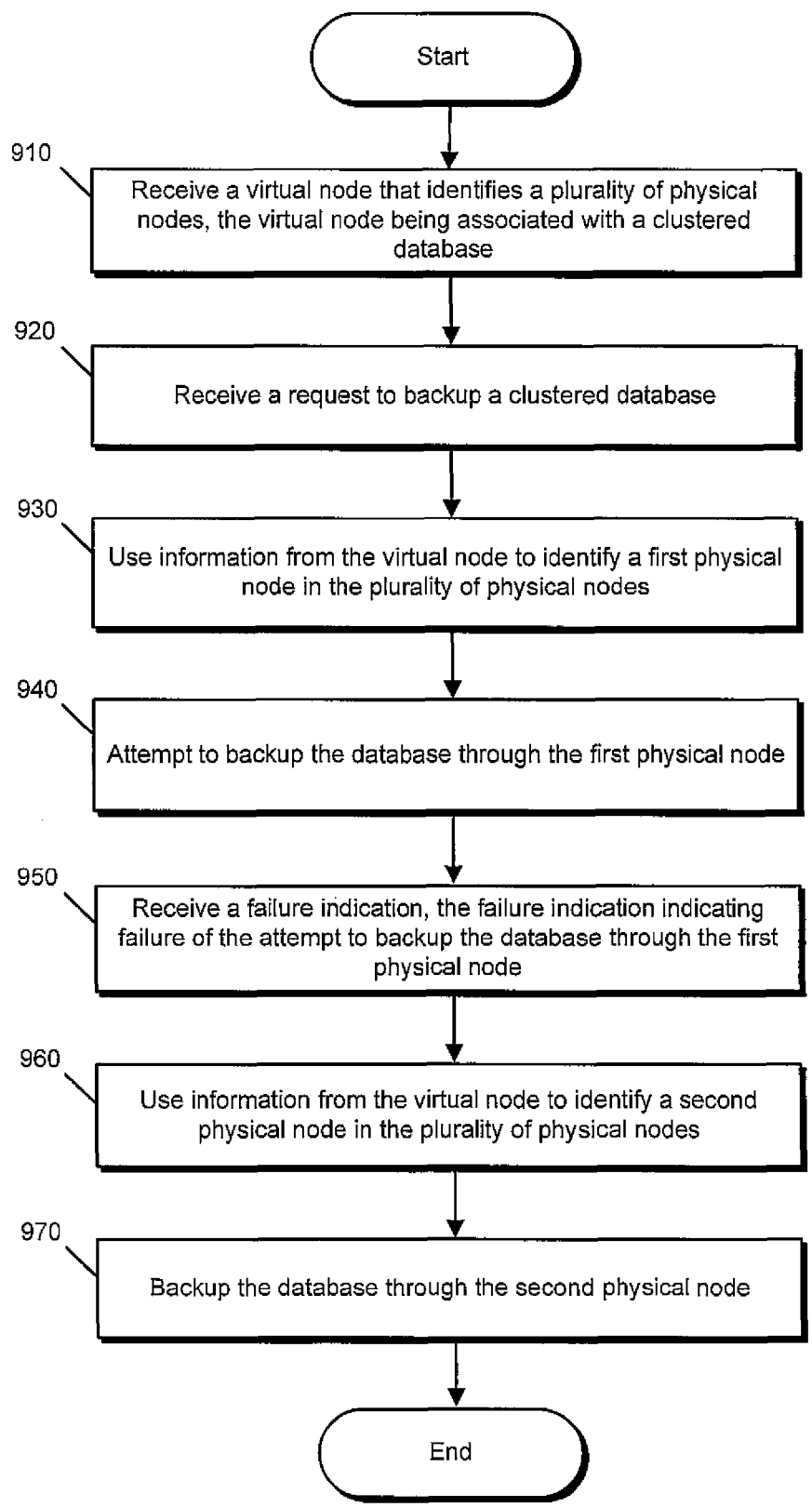
FIG. 9 is a flow diagram of another exemplary method of backing up a database through a virtual node according to certain embodiments.

A user may select a node shown in graphical user interface 400 to use for backing up data 172. For example, if a user selects the "backup node 120" button, data 172 may be backed up through node 120. FIGS. 7-9 show additional examples of using a virtual node to backup data and perform other data protection operations on data.

When an instance of the application cluster is down, the identification information for the node associated with the instance may no longer be advertised. For example, if instance 152 is down (e.g., data 172 is not accessible through instance 152), the virtual node may no longer contain a network address of node 150. Thus, if a data protection application attempts to backup data 172 of the application cluster through node 150 when instance 152 is down, the data protection module may select a different network address (i.e., a different node) from the virtual node and may attempt the backup again.

Figure 5:
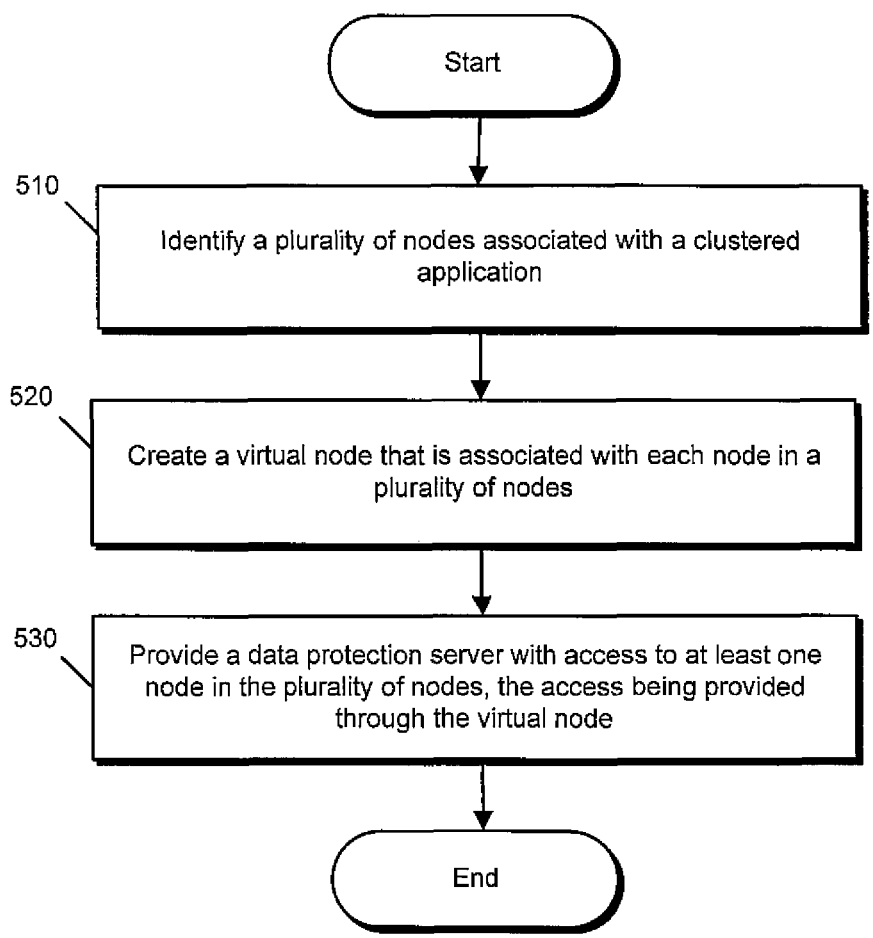
FIG. 5 is a flow diagram of an exemplary method of creating a virtual node according to certain embodiments.

FIG. 5 is a flow diagram showing the steps of creating a virtual node and providing access to other nodes through the virtual node. First, a data protection module may identify a plurality of nodes associated with an application cluster (step 510). After identifying the plurality of nodes associated with the application cluster, the data protection module may create a virtual node that is associated with each node in the plurality of nodes (step 520). In some embodiments, a module or application other than a data protection module may perform either or both of the identifying and creating steps. After the virtual node is created, the application cluster may provide a data protection server with access to at least one node in the plurality of nodes, the access being provided through the virtual node (step 530).

Figure 6:
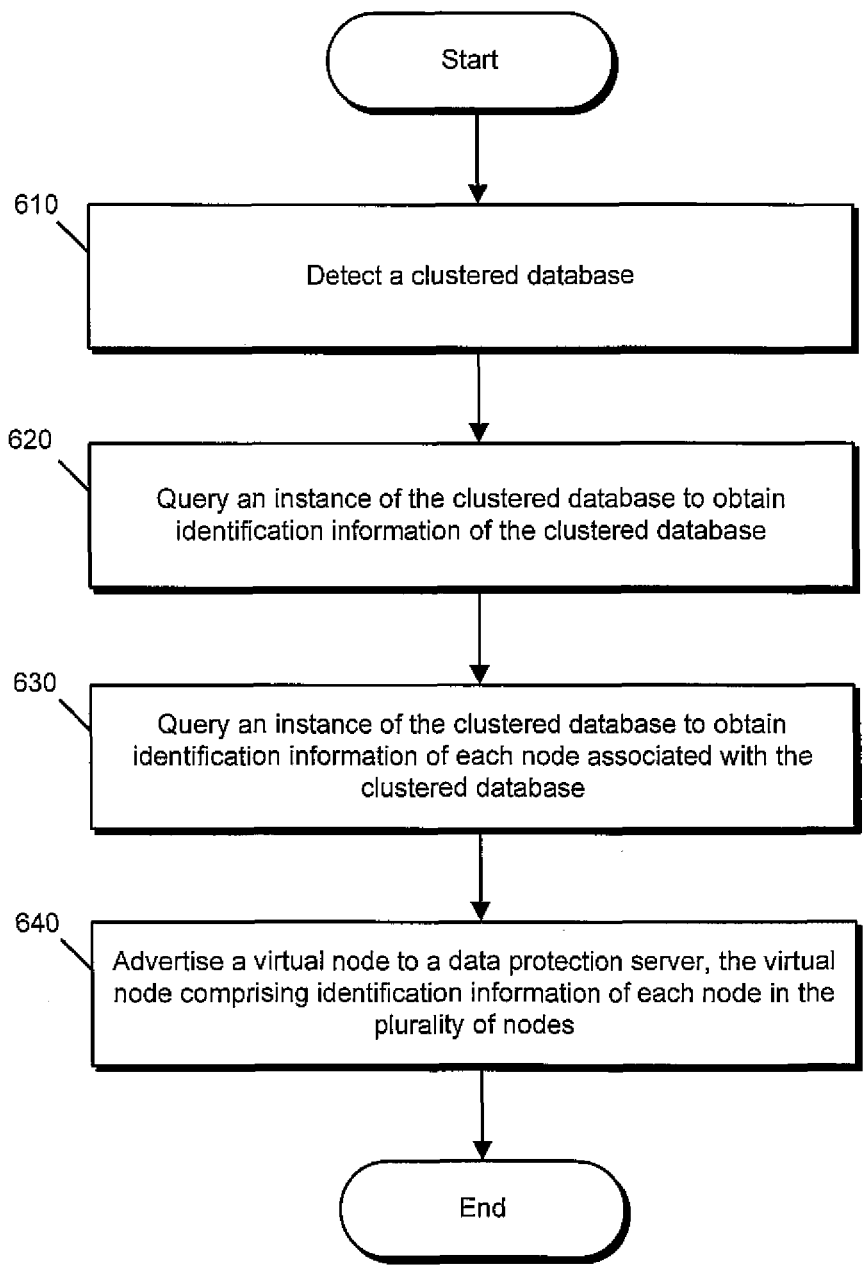
FIG. 6 is a flow diagram of an exemplary method for advertising a virtual node to a data protection server according to certain embodiments.

FIG. 6 is a flow diagram illustrating exemplary steps of creating a virtual node for a clustered database. A data protection module may detect a clustered database (step 610) and query an instance of the clustered database to obtain identification information of the clustered database (step 620). An instance of the clustered database may be an instantiation of a database, and a clustered database may include multiple instances. The data protection module may also query the instance of the clustered database to obtain identification information of each node associated with the clustered database (step 630). The database protection module may advertise a virtual node to a data protection server (step 640), and the virtual node may comprise identification information of each node in the plurality of nodes.

FIG. 7 is a flow diagram illustrating exemplary steps of attempting to perform a data protection operation on a database. A data protection operation may be a backup operation, a restoration operation, a recovery operation, or any other suitable operation for protecting data. A backup operation may be an operation that backs up the data stored in the database. A restoration operation may be an operation that restores data to a database after a database failure (or after any other event that adversely effects data from the database). The recovery operation may be any suitable operation for repairing and/or otherwise recovering data after a failure in the database.

The steps illustrated in FIG. 7 may be performed by a data protection application or module running on a database protection server, such as database protection server 110. The steps in FIG. 7 may also be performed by a data protection application that is running on any other suitable computing device. A data protection application may be any suitable set of computer-readable instructions for performing and/or coordinating one or more data protection operations (e.g., backing up data, restoring data, recovering data).

The data protection application may receive a virtual node that identifies a plurality of physical nodes (step 710). The virtual node may be associated with a clustered database. The data protection application may receive the virtual node from a data protection agent running on a physical node associated with the clustered database. In some embodiments, the data protection application may receive the virtual node from the physical node when the physical node advertises the virtual node, as previously discussed.

The data protection application may receive a request to perform a data protection operation on the clustered database. The data protection request may be part of regularly scheduled maintenance, such as a scheduled backup. The request may also be a request received from a user.

The data protection application may use information from the virtual node to identify a first physical node in the plurality of physical nodes (step 730). The information from the virtual node may be a machine name, a network address, or any other suitable identification information for a physical node or for a data protection agent running on a physical node. The information used to identify the physical node may also be information associated with an instance of the clustered database that is running on the physical node.

The data protection application may attempt to perform the data protection operation on the database through the first physical node (step 740). In some embodiments, several conditions may need to be met for the data protection operation to be successful. For example, the first physical node may need to be running in order for the data protection application to perform the data protection operation through the first physical node. Generally, the first physical node may be considered to be running if the first physical node is powered on and operational. Thus, if the first physical node is not powered on or is not operational for some other reason (e.g., the first physical node may be experiencing hardware and/or software problems that render the first physical node unable to perform the data protection operation), the data protection operation may not be performed through the first physical node.

In addition to the first physical node being up and running, a data protection agent may need to be running on the first physical node in order for the data protection operation to be performed through the first physical node. A data protection agent may be a software module or any other software application or computer-readable instructions that communicate with the data protection application. In some embodiments, the data protection agent may provide communication between the data protection application and the database. Thus, if the data protection agent is not running on the first physical node, the data protection application may not be able to perform the data protection operation through the first physical node.

An instance of the database may also need to be running on the first physical node in order for the data protection operation to be performed through the first physical node. If an instance of the database is not running on the first physical node, the data protection agent may not be able to communicate with the clustered database. If the data protection application is unable to perform the data protection operation on the database through the first physical node, the data protection application may use the virtual node to identify a second physical node and may perform the data protection operation on the second physical node. FIGS. 8A and 8B show an example of how a data protection application may attempt to use multiple physical nodes to perform a data protection operation.

FIGS. 8A and 8B illustrate an exemplary method of performing a backup operation through a virtual node. Node 120 may advertise a virtual node to a data protection server 110 (step 805). Data protection server 110 may include a data protection application and node 120 may include data protection agent 124. In some embodiments, communications between node 120 and data protection server 110 may be facilitated by the data protection application and data protection agent 124.

At some point after receiving the virtual node, data protection server 110 may receive a request to backup a clustered database (step 810). This request may come from a user or from any other application or network device. Data protection server 110 may identify a first physical node (step 815) after receiving the backup request.

After identifying a first physical node, data protection server 110 may connect to a first data protection agent (e.g., data protection agent 124) and send a browse request to the first data protection agent (step 820). As part of a browse request, node 120 may determine whether a database instance is running on node 120. In this example, node 120 may determine that a first database instance (e.g., instance 122) is not running (step 825). After determining that the first database instance is not running, node 120 may update the virtual node (step 830).

Updating the virtual node may include removing any identification of node 120 from the virtual node so that protection server 110 does not attempt to perform the backup through node 120. Updating the virtual node may also include editing the virtual node such that the virtual node indicates to data protection server 110 that node 120 is no longer available for performing data protection operations.

In the example shown in FIGS. 8A and 8B, the virtual node is updated after determining that a database instance is not running. A virtual node may also be updated to exclude identification information for a physical node after determining that a backup module is not running on a physical node. In various embodiments, a virtual node may be updated to exclude identification information for a physical node after determining that the physical node is not running. A virtual node may be updated to exclude identification information for a physical node by excluding all or a portion of information that identifies the physical node. For example, a virtual node may be updated to exclude an IP address of the physical node, a name of the physical node, or any other information that identifies the physical node.

Node 120 may advertise the virtual node to data protection server 110 (step 835). Node 120 may also send a report to data protection server 110 informing data protection server 110 that the first database instance is down (step 840). This report may be an error report or any other suitable report that lets data protection server 110 know that the backup operation cannot be performed through node 120. After receiving the error report, data protection server 110 may remove the connection to the first data protection agent (step 845). In other embodiments, data protection server 110 may not remove the connection to the first data protection agent. Data protection server 110 may then identify a second physical node, such as node 130 (step 850).

Data protection server 110 may perform the same operations on node 130 that it performed on node 120. For example, data protection server 110 may connect to a second data protection agent (e.g., data protection agent 134) and send a browse request to the second data protection agent (step 855). After receiving the browse request, node 130 may determine that a second database instance is running on node 130 (step 860). Node 130 may report to data protection server 110 that the second database instance is up (step 865), and data protection server 110 may request data from the clustered database (step 870). The data from the clustered database may then be sent from node 130 to data protection server 110 (step 880) or any other suitable storage device.

As shown in FIGS. 8A and 8B, a virtual node may cycle through multiple physical nodes when attempting to perform a data protection operation. This process may increase the possibility that a data protection operation will be successful. FIGS. 8A and 8B show that a data protection operation is successfully performed on the second node. In other embodiments, a data protection server may attempt to perform a data protection operation through any number of physical nodes before successfully completing the data protection operation.

FIG. 9 is a flow diagram of another exemplary method of backing up a database using a virtual node. A data protection application may receive a virtual node that identifies a plurality of physical nodes (step 910). The virtual node may be associated with a clustered database. A virtual node may be considered to be associated with a clustered database if the virtual node includes information about physical nodes that are running instances of the clustered database.

The data protection application may receive a request to backup a clustered database (step 920) and may use information from the virtual node to identify a first physical node in the plurality of physical nodes (step 930). The data protection application may also attempt to backup the database through the first physical node (step 940). If the first physical node is unavailable, the data protection application may receive a failure indication (step 950). The failure indication may indicate failure of the attempt to backup the database through the first physical node.

The data protection application may use information from the virtual node to identify a second physical node in the plurality of physical nodes (step 960). If the second physical node is capable of performing backup operations on the clustered database, the clustered database may be backed up through the second physical node (step 970). A database may be backed up through a physical node when a data protection server uses the physical node as a point of contact with the database.

Figure 10:
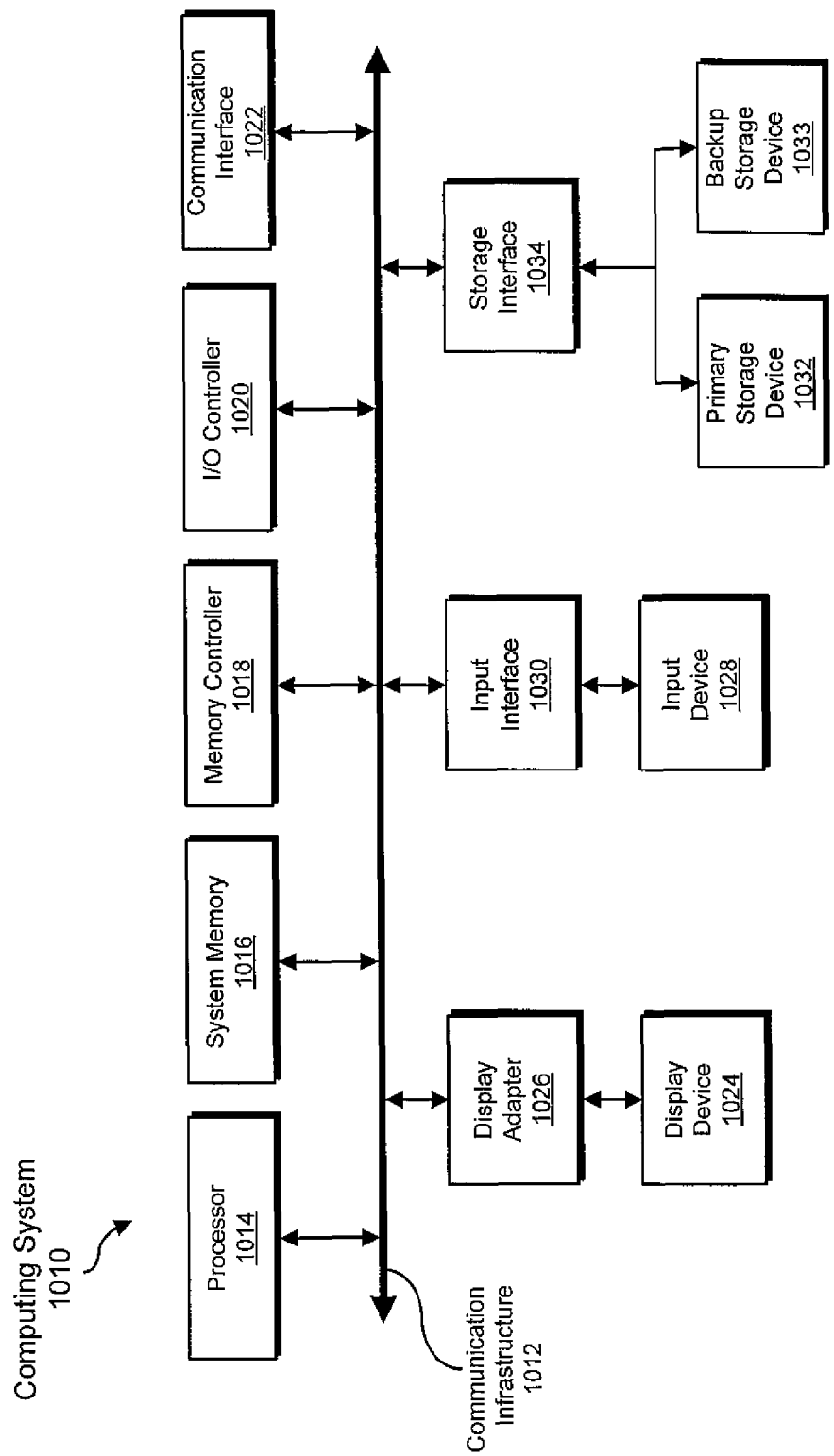
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the receiving, attempting, using, connecting, determining, updating, performing, and presenting steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing device 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1018, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as receiving, attempting, using, connecting, determining, updating, performing, and/or presenting.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the receiving, attempting, using, connecting, determining, updating, performing, and/or presenting steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the receiving, attempting, using, connecting, determining, updating, performing, and/or presenting steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the receiving, attempting, using, connecting, determining, updating, performing, and/or presenting steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1038. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1038 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the receiving, attempting, using, connecting, determining, updating, performing, and/or presenting steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
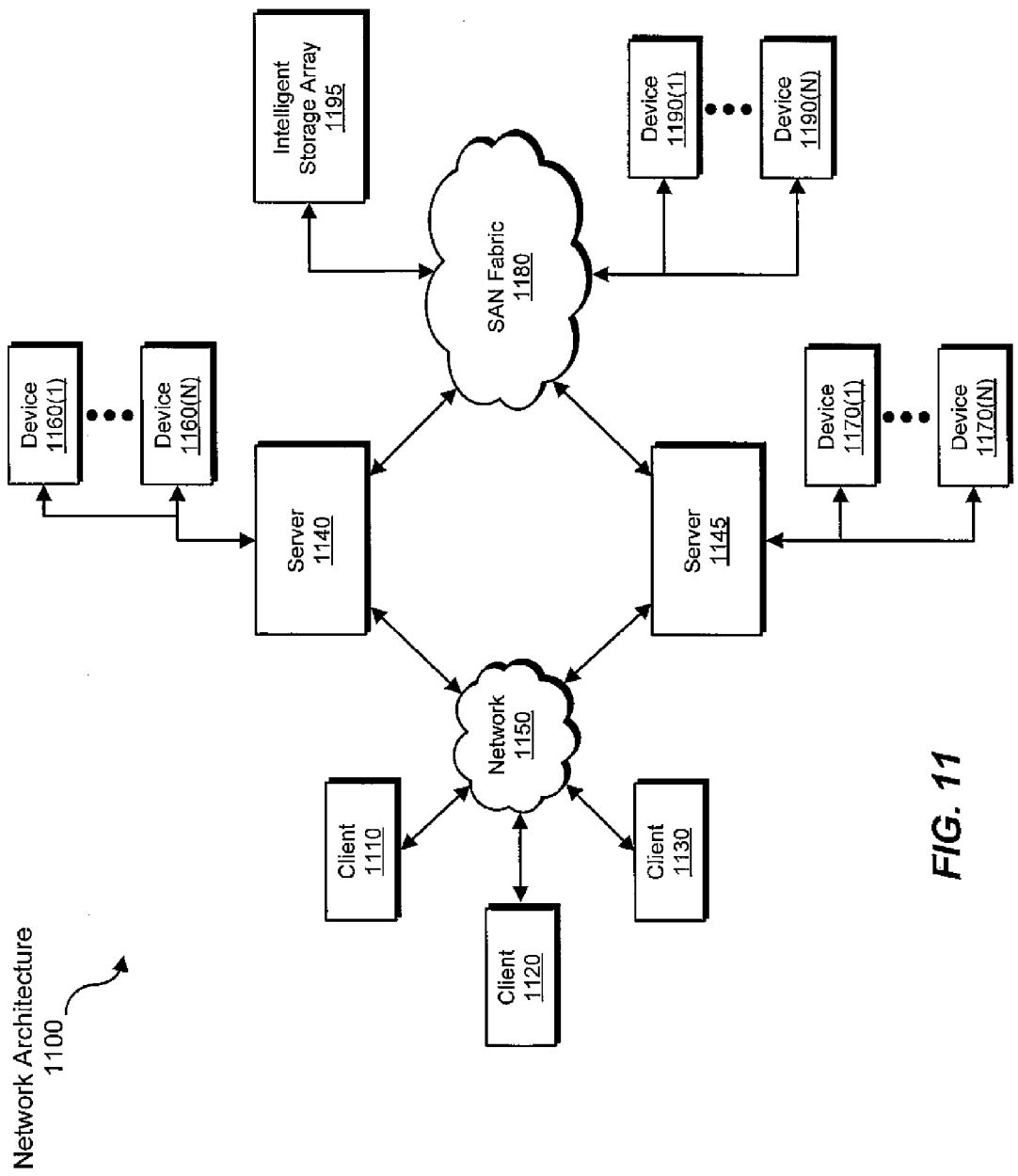
FIG. 11 is a block diagram of an exemplary network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1150, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the receiving, attempting, using, connecting, determining, updating, performing, and/or presenting steps disclosed herein. Network architecture 1100 may also be used to perform and/or be a means for performing other steps and features set forth in the instant disclosure.

For example, in certain embodiments the exemplary file systems disclosed herein may be stored on client systems 1110, 1120, and/or 1130. Similarly, the exemplary file-system backups disclosed herein may be stored on server 1140, server 1145, storage devices 1160(1)-(N), storage devices 1170(1)-(N), storage devices 1190(1)-(N), intelligent storage array 1195, or any combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method comprising:
   detecting, by a data protection agent running on a physical node of a clustered database, that an instance of the clustered database at the same physical node as the data protection agent is part of the clustered database rather than a single-instance database;
   requesting, by the data protection agent, in response to detecting that the instance of the clustered database at the same physical node as the data protection agent is part of the clustered database rather than a single-instance database, identification information from the instance for each physical node of the clustered database that constitutes an access point for the clustered database;
   creating, in response to receiving the requested identification information for each physical node of the clustered database, by the data protection agent running on the physical node of the clustered database, a virtual node that comprises a data structure that specifies network addresses for a plurality of physical nodes of the clustered database;
   advertising, by the data protection agent, the created virtual node to a data protection server that is connected to the physical node through a network;
   receiving, by the data protection server over the network, the created virtual node that identifies the plurality of physical nodes of the clustered database;
   receiving a request to perform a data protection operation on the clustered database;
   determining that the clustered database is not accessible through a first physical node;
   updating the virtual node to reflect the determination that the clustered database is not accessible through the first physical node;
   using information from the virtual node to identify a second physical node in the plurality of physical nodes;
   performing the data protection operation on the clustered database through the second physical node.

2. The method of claim 1, further comprising:
   creating, by an additional data protection agent running on an additional physical node of the clustered database, an additional virtual node;
   advertising, by the additional data protection agent running on the additional physical node of the clustered database, the additional virtual node to the data protection server.

3. The method of claim 2, further comprising
   overwriting, by the data protection server, the virtual node with the additional virtual node in a cache.

4. The method of claim 1, wherein the data protection server stores the virtual node within a cache.

5. The method of claim 1, wherein the data protection agent requests, in response to detecting that the instance of the clustered database at the same physical node as the data protection agent is part of the clustered database rather than a single-instance database, clustered database identification information from the instance to create the virtual node.

6. The method of claim 5, wherein the clustered database identification information comprises at least one of:
   a name of the clustered database;
   an identification number of the clustered database.

7. The method of claim 1, wherein each network address comprises an internet protocol address.

8. The method of claim 1, further comprising:
   using, by the data protection server, the virtual node to identify each physical node in the plurality of physical nodes;
   presenting, by the data protection server, each physical node in the plurality of physical nodes to a user for selection.

9. The method of claim 8, further comprising receiving, by the data protection server, a selection from the user of a physical node from the plurality of physical nodes.

10. The method of claim 1, wherein the data protection operation backs up the clustered database.

11. A system comprising:
   a data protection agent running on a physical node of a clustered database and programmed to:
   detect that an instance of the clustered database at the same physical node as the data protection agent is part of the clustered database rather than a single-instance database;
   request in response to detecting that the instance of the clustered database at the same physical node as the data protection agent is part of the clustered database rather than a single-instance database, identification information from the instance for each physical node of the clustered database that constitutes an access point for the clustered database;
   create, in response to receiving the requested identification information for each physical node of the clustered database, a virtual node that comprises a data structure that specifies network addresses for a plurality of physical nodes of the clustered database;
   determine that the clustered database is not accessible through a first physical node;
   update the virtual node to reflect the determination that the clustered database is not accessible through the first physical node;
   advertise the created virtual node to a data protection server that is connected to the physical node through a network;
   a data protection application programmed to:
   receive, over the network, the created virtual node that identifies the plurality of physical nodes of the clustered database;
   receive a request to perform a data protection operation on the clustered database;
   use information from the virtual node to identify a second physical node in the plurality of physical nodes;
   perform the data protection operation on the clustered database through the second physical node.

12. The system of claim 11, wherein the data protection server is programmed to store the virtual node within a cache.

13. The system of claim 11, wherein the data protection agent is programmed to request, in response to detecting that the instance of the clustered database at the same physical node as the data protection agent is part of the clustered database rather than a single-instance database, clustered database identification information from the instance to create the virtual node.

14. The system of claim 11, wherein the data protection operation backs up the clustered database.

15. The system of claim 11, wherein the data protection server is further programmed to present the physical nodes in the plurality of physical nodes to a user for selection.

16. A non-transitory computer-readable medium comprising one or more computer-executable instructions that, when executed by at least one processor of a computing device, cause the computing device to:
   detect, by a data protection agent running on a physical node of a clustered database, that an instance of the clustered database at the same physical node as the data protection agent is part of the clustered database rather than a single-instance database;
   request, by the data protection agent, in response to detecting that the instance of the clustered database at the same physical node as the data protection agent is part of the clustered database rather than a single-instance database, identification information from the instance for each physical node of the clustered database that constitutes an access point for the clustered database;
   create, in response to receiving the requested identification information for each physical node of the clustered database, by the data protection agent running on the physical node of the clustered database, a virtual node that comprises a data structure that specifies network addresses for a plurality of physical nodes of the clustered database;
   advertise, by the physical node where the data protection agent is running, the created virtual node to a data protection server that is connected to the physical node through a network;
   receive, by the data protection server over the network, the created virtual node that identifies the plurality of physical nodes of the clustered database;
   receive a request to perform a data protection operation on the clustered database;
   determine that the clustered database is not accessible through a first physical node;
   update the virtual node to reflect the determination that the clustered database is not accessible through the first physical node;
   use information from the virtual node to identify a second physical node in the plurality of physical nodes;
   perform the data protection operation on the clustered database through the second physical node.

17. The computer-readable medium of claim 16, wherein the computer-executable instructions cause the computing device to
   determine that the clustered database is accessible through the second physical node.

18. The computer-readable medium of claim 16, wherein the data protection server stores the virtual node within a cache.

19. The computer-readable medium of claim 16, wherein each network address comprises an internet protocol address.

20. The computer-readable medium of claim 16, wherein the data protection operation backs up the clustered database.

* * * * *